C. M. KEELER.
GARDENER'S IMPLEMENT AND WEED CLIPPER.
APPLICATION FILED MAY 15, 1914.
1,127,015.  Patented Feb. 2, 1915.
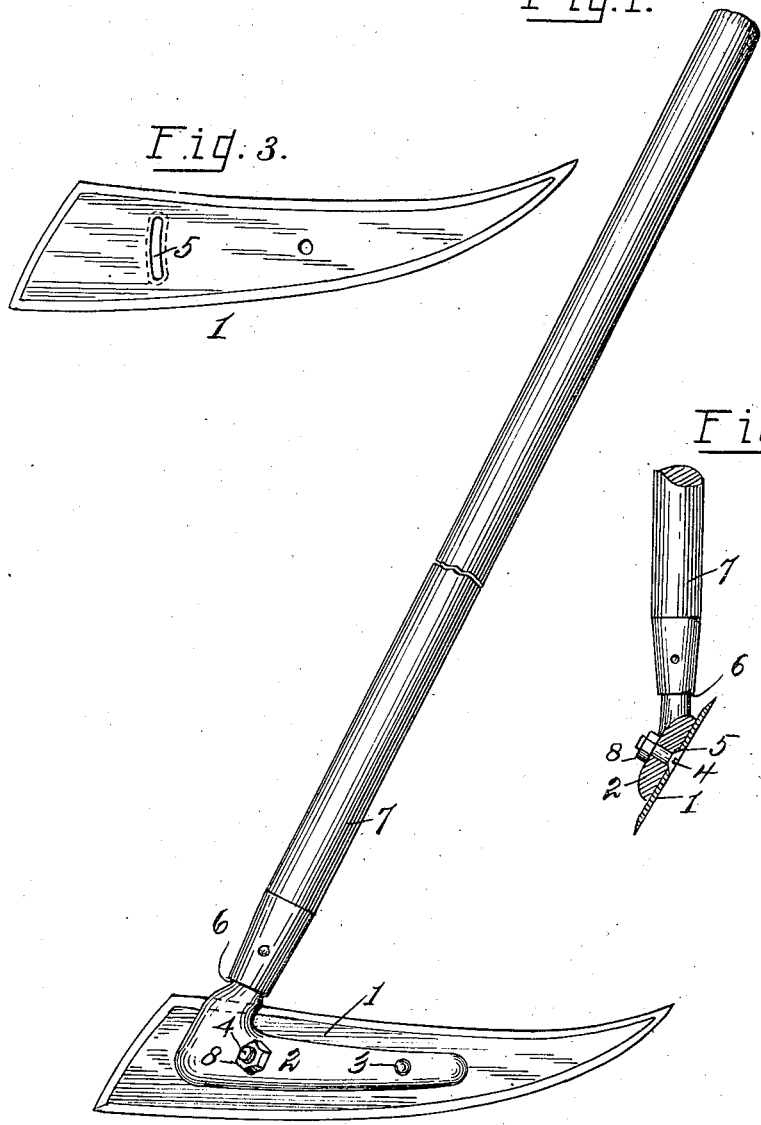
WITNESSES:
D. C. Walter.
Gertrude Bracker.
INVENTOR:
Clark M. Keeler

UNITED STATES PATENT OFFICE.

CLARK M. KEELER, OF HASKINS, OHIO.

GARDENER'S IMPLEMENT AND WEED-CLIPPER.

1,127,015.  Specification of Letters Patent.  Patented Feb. 2, 1915.

Application filed May 15, 1914. Serial No. 838,695.

*To all whom it may concern:*

Be it known that I, CLARK M. KEELER, a citizen of the United States, residing at Haskins, in the county of Wood and State of Ohio, have invented certain new and useful Improvements in Gardeners' Implements and Weed-Clippers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is designed to furnish an implement especially adapted for cutting out noxious weeds in places difficult of access or where such weeds are found among shrubs or grasses or grain which it is desirable not to disturb in attacking the weeds.

To this end my implement consists of the device hereinafter described, and shown, and illustrated in the accompanying drawings, in which—

Figure 1, is a perspective view of my implement; Fig. 2, a transverse sectional elevation of the same, and Fig. 3, top-plan view of the blade hereinafter referred to, with the handle removed.

Like numerals indicate like parts throughout the drawings.

In the drawings 1 is a flat thin blade pointed at one end, broadened at its other end, the two longer sides being curved as shown. This three sided blade is brought to an edge continuously on all three of its margins.

2 is a shank-piece flattened on its bottom side to conform to the top of the blade and loosely connected to the blade near its forward end by a pin 3. Near its other end, or heel, a threaded-bolt 4 passes through the shank-piece and through a slot 5 in the blade, which slot is curved in the arc of a circle of which the pin 3 is the center. The shank-piece is provided with a forwardly and laterally inclined tine 6 which is connected with the handle 7 in the usual or any preferred manner. The tine and handle 6—7 are inclined forwardly toward the point of the blade and laterally toward the shorter curve of the blade.

The slot 5 is countersunk as shown in Fig. 2 to receive the head of the bolt 4.

A nut 8 on the threaded protruding upper end of the bolt holds the blade tightly clamped in any position to which it may swing upon the pivot 3. This adjustment permits the variation of the angle of the blade to the handle so that the blade and handle together may be made to assume a more or less hook-like form, and to accommodate the implement to its various uses and to the position of the operator.

It will be seen that the point and corners of the blade may be forced into corners and recesses inaccessible to the ordinary garden implement.

Having described my invention, what I claim and desire to secure by Letters Patent, is—

1. A short flat curved blade having a broadened heel, the three margins of said blade having a continuous edge, combined with a handle secured to the flat upper side of the blade, and means for adjusting the position of the handle upon the blade.

2. In a device of the described character, a flat curved blade having a pointed end and a broadened heel, the margins of the blade forming a continuous edge, there being through the blade a curved slot, a shank-piece pivoted upon the top of the blade and a threaded-bolt engaging said shank-piece and said curved slot.

3. A device of the described character comprising a flat curved blade pointed at one end and broadened at its other end and having therethrough a curved slot, a shank-piece pivotally mounted upon the top of the blade and adjustably connected with said blade through said curved slot by means of a threaded bolt passing through said slot and through said shank-piece, a nut upon said bolt, and an inclined handle secured to said shank-piece.

In testimony whereof I affix my signature in presence of two witnesses.

CLARK M. KEELER.

Witnesses:
 GEO. B. ONVIG,
 GERTRUDE BRACKER.